(12) United States Patent
Marquardt et al.

(10) Patent No.: US 11,704,528 B2
(45) Date of Patent: Jul. 18, 2023

(54) RFID DEVICE WITH TWO-STAGE POWER HARVESTING

(71) Applicant: T-Mobile Innovations LLC, Overland Park, KS (US)

(72) Inventors: Ronald R. Marquardt, Woodinville, WA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/568,019

(22) Filed: Jan. 4, 2022

(65) Prior Publication Data

US 2022/0121894 A1 Apr. 21, 2022

Related U.S. Application Data

(62) Division of application No. 17/024,484, filed on Sep. 17, 2020, now Pat. No. 11,238,324.

(51) Int. Cl.
*G08B 21/00* (2006.01)
*G06K 19/07* (2006.01)
*H04B 5/00* (2006.01)

(52) U.S. Cl.
CPC ..... *G06K 19/0723* (2013.01); *G06K 19/0707* (2013.01); *H04B 5/0031* (2013.01);
(Continued)

(58) Field of Classification Search
CPC ........... G06K 19/0723; G06K 19/0707; G06K 19/0709; G06K 19/0712; H04B 5/0031;
(Continued)

(56) References Cited

U.S. PATENT DOCUMENTS

| 6,882,128 B1 | 4/2005 | Rahmel et al. |
| 8,593,256 B2 * | 11/2013 | Isabell ..................... D06H 1/00 24/104 |

(Continued)

FOREIGN PATENT DOCUMENTS

| EP | 4172863 A1 | 5/2023 |
| WO | 2008051598 A2 | 5/2008 |

(Continued)

OTHER PUBLICATIONS

Office Action dated Apr. 30, 2020, U.S. Appl. No. 16/158,299, filed Oct. 12, 2018.

(Continued)

*Primary Examiner* — Mark S Rushing

(57) ABSTRACT

Disclosed is a method of gathering data from a hybrid RFID chip to determine usage of an item or article of clothing using a mobile device like a phone, laptop, or tablet. The hybrid RFID chip consists of a processor, a memory, a radio transceiver, a power harvesting antenna, and an impedance circuit that converts ambient radio frequency (RF) energy to electrical energy. The RFID chip receives a first power level from ambient RF energy and periodically broadcasts an identity. The mobile device can receive the broadcast identity, store the identity, transmit the identity and location to a remote server, and receive a notification message from the remote server. The remote serve can determine usage of the item or article of clothing by comparing current records to previous records of RFID chip identity, location, and mobile device application identity.

14 Claims, 12 Drawing Sheets

(52) U.S. Cl.
CPC ....... *H04B 5/0062* (2013.01); *H04Q 2209/47* (2013.01); *H04Q 2209/886* (2013.01)

(58) Field of Classification Search
CPC ............. H04B 5/0062; H04Q 2209/47; H04Q 2209/886
See application file for complete search history.

(56) References Cited

U.S. PATENT DOCUMENTS

| | | | |
|---|---|---|---|
| 9,411,992 | B1 | 8/2016 | Marek et al. |
| 9,894,471 | B1 | 2/2018 | Zalewski et al. |
| 10,938,449 | B1 | 3/2021 | Loman et al. |
| 11,238,324 | B1 | 2/2022 | Marquardt et al. |
| 11,258,302 | B1 | 2/2022 | Marquardt et al. |
| 2007/0205902 | A1* | 9/2007 | Cote ...................... G01V 15/00 340/572.9 |
| 2008/0018467 | A1 | 1/2008 | Estevez et al. |
| 2008/0129457 | A1* | 6/2008 | Ritter ..................... G07C 9/257 340/10.1 |
| 2010/0102123 | A1 | 4/2010 | Skowronek |
| 2014/0134468 | A1 | 5/2014 | Schaefer et al. |
| 2015/0048682 | A1 | 2/2015 | Murley |
| 2019/0034672 | A1* | 1/2019 | Rokhsaz ............ G06K 7/10158 |
| 2019/0138870 | A1* | 5/2019 | Kuzbari ............. G06K 19/0711 |
| 2019/0354824 | A1* | 11/2019 | Mohiuddin .......... G06Q 20/201 |
| 2020/0004999 | A1 | 1/2020 | Kawaguchi et al. |
| 2020/0227813 | A1 | 7/2020 | Yehezkely |
| 2021/0019482 | A1* | 1/2021 | Shakedd ................. H02J 7/345 |
| 2022/0180141 | A1 | 6/2022 | Marquardt et al. |
| 2022/0344971 | A1 | 10/2022 | Marquardt et al. |

FOREIGN PATENT DOCUMENTS

| | | |
|---|---|---|
| WO | 2008055212 A2 | 5/2008 |
| WO | 2015187199 A1 | 12/2015 |
| WO | 2018063449 A1 | 4/2018 |
| WO | 2018132120 A1 | 7/2018 |
| WO | 2022060457 A1 | 3/2022 |
| WO | 2022060475 A1 | 3/2022 |
| WO | 2022125162 A1 | 6/2022 |
| WO | 2022231682 A1 | 11/2022 |

OTHER PUBLICATIONS

Notice of Allowance dated Oct. 30, 2020, U.S. Appl. No. 16/158,299, filed Oct. 12, 2018.
Notice of Allowance dated Oct. 5, 2021, U.S. Appl. No. 17/024,484, filed Sep. 17, 2020.
Notice of Allowance dated Oct. 21, 2021, U.S. Appl. No. 17/240,846, filed Apr. 26, 2021.
Foreign Communication From a Related Counterpart Application, International Search Report and Written Opinion dated Nov. 23, 2021, International Application No. PCT/US2021/044086 filed on Jul. 31, 2021.
Foreign Communication From a Related Counterpart Application, International Search Report and Written Opinion dated Dec. 6, 2021, International Application No. PCT/US2021/051159 filed on Sep. 20, 2021.
Loman, Clinton H., et al., "Battery Coupled Radio Frequency Identity (RFID)," filed Jan. 28, 2021, U.S. Appl. No. 17/161,415.
Marquardt, Ronald, R., et al., "Multi-tier Identities in an RFID Chip," filed Dec. 8, 2020, U.S. Appl. No. 17/115,596.
Marquardt, Ronald, R., et al., "RFID Device with Two-Stage Power Harvesting," filed Jul. 31, 2021, International Application No. PCT/US2021/044086.
Marquardt, Ronald, R., et al., "Multi-tier Identities in an RFID Chip," filed Sep. 20, 2021, International Application No. PCT/US2021/051159.
Marquardt, Ronald, R., et al., "Ambient Electromagnetic Power Harvesting Chip Adaptation Based on Available Power Level," filed Jan. 7, 2022, U.S. Appl. No. 17/571,294.
Marquardt, Ronald, R., et al., "Ambient Electromagnetic Power Harvesting Chip Adaptation Based on Available Power Level," filed Feb. 22, 2022, International Application No. PCT/US2022/017304.
Foreign Communication From a Related Counterpart Application, International Search Report and Written Opinion dated May 30, 2022, International Application No. PCT/US2022/017304.
Bales, Mark, R., et al., "System and Method of Controlling Unique Identities of Ambient Electromagnetic Power Harvesting Chips," filed Jul. 18, 2022, U.S. Appl. No. 17/867,218.
Foreign Communication From a Related Counterpart Application, Invitiation to Pay Additional Fees dated May 30, 2022, International Application No. PCT/US2022/017304.
Notice of Allowance dated May 3, 2023, U.S. Appl. No. 17/867,218, filed Jul. 18, 2022.
Bales, Mark, R., et al., "System and Method of Controlling Lifecycles of Ambient Electromagnetic Power Harvesting Chips," filed Feb. 7, 2023, Application No. System and Method of Controlling Lifecycles of Ambient Electromagnetic Power Harvesting Chips.

* cited by examiner

RFID DEVICE WITH TWO-STAGE POWER HARVESTING

CROSS-REFERENCE TO RELATED APPLICATIONS

This application is a divisional of and claims priority under 35 U.S.C. § 120 to U.S. patent application Ser. No. 17/024,484, filed on Sep. 17, 2020, entitled "RFID Device with Two-Stage Power Harvesting," by Ronald R. Marquardt, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio-frequency identification (RFID) uses electromagnetic fields to energize tags attached to objects to identify the object and the object location. An RFID tag consists of a radio receiver, a radio transmitter, and a unique identification. When triggered by an electromagnetic interrogation pulse from a nearby RFID reader device, the tag broadcasts digital data, usually an identifying inventory number, back to the reader. This number can be used to inventory goods. There are two types. Passive tags are powered by energy harvested from radio waves emitted by the RFID reader. Active tags are powered by a battery and thus can be read at a greater range from the RFID reader, up to hundreds of meters. Unlike a barcode, the tag doesn't need to be within the line of sight of the reader, so it may be embedded in the tracked object.

SUMMARY

In an embodiment, an energy harvesting radio Frequency Identification (RFID) chip with two level power output is disclosed. The RFID chip comprises a processor, a non-transitory memory, a first radio transceiver, an impedance circuit, an energy storage device, and an application stored in memory. The impedance circuit is configured to convert radio frequency (RF) energy received by a first energy harvesting antenna to a first electrical energy level by a first ambient radio frequency energy range and a second electrical energy level by proximate radio frequency energy. An energy storage device is configured to store electrical energy. And an application stored in the non-transitory memory that, when executed by the processor in response to a first electrical energy level, transfers a beacon to the first radio transceiver to broadcast in a first radio frequency range; and in response to the second energy level, transfers a message to the first radio transceiver to broadcast by the first radio frequency range.

In another embodiment, a method of determining usage of an article based on communicating data from a User Equipment (UE) is disclosed. The method comprises receiving, by a monitoring application executing on a User Equipment (UE), a Radio Frequency Identification (RFID) message from a plurality of RFID tags, storing an application data package, by the monitoring application, in non-transitory memory on the UE. The method further comprises establishing a communication session by the monitoring application with a remote application executing on a remote network via a wireless connection with a wireless protocol to a wireless receiver communicatively coupled to the remote network, sending the RFID message from the monitoring application to the remote application, writing a current data record, by the remote application, into non-transitory memory on the remote network, wherein the current data record comprises the application data set, a current data hash, and a previous data hash. The method further comprises determining an event record, by the remote application, by comparing the application data set of the current data record to the application data set of a previous data record, and sending an event notification, by the remote application, to the monitoring application executing on the UE.

In yet another embodiment, a textile fabric system is disclosed. The textile fabric system comprises an article made from textile fabric including a textile fabric and a seam. The textile fabric system further comprises a radio Frequency Identification (RFID) chip retained by the seam. The RFID chip comprises a non-transitory memory, a processor, a radio transceiver, an antenna, an impedance circuit configured to convert energy received from a first energy harvesting antenna to a first electrical energy level by ambient radio frequency signals and a second electrical energy level by proximate radio frequency signals. The RFID chip further comprises an energy storage device configured to store electrical energy, and an application stored in the non-transitory memory that, when executed by the processor in response to a first electrical energy level, transfers an RFID identification to a first radio transceiver to broadcast in a first radio frequency signal. The textile fabric system further comprises a user equipment (UE). The UE comprises a processor, a memory, a short range radio transceiver, a long range radio transceiver, and a monitoring application executing in memory, configured to send an application data package by establishing a communication session, with a remote application executing on a remote network via a wireless connection with a wireless communication protocol to a wireless receiver communicatively coupled to the remote network, wherein the application data package comprises the RFID identification, an application identification, a date stamp, a timestamp, and a location data set, wherein the location data set comprises the location data of the UE. The textile fabric system further comprises a remote network. The remote network comprises a remote application, executing on the remote network, configured to send an event notification, to the monitoring application on the UE, in response to a comparison of a previous application data package to the application data package received from the monitoring application on the UE and wherein the event notification, by the remote monitoring application, consists of a usage message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
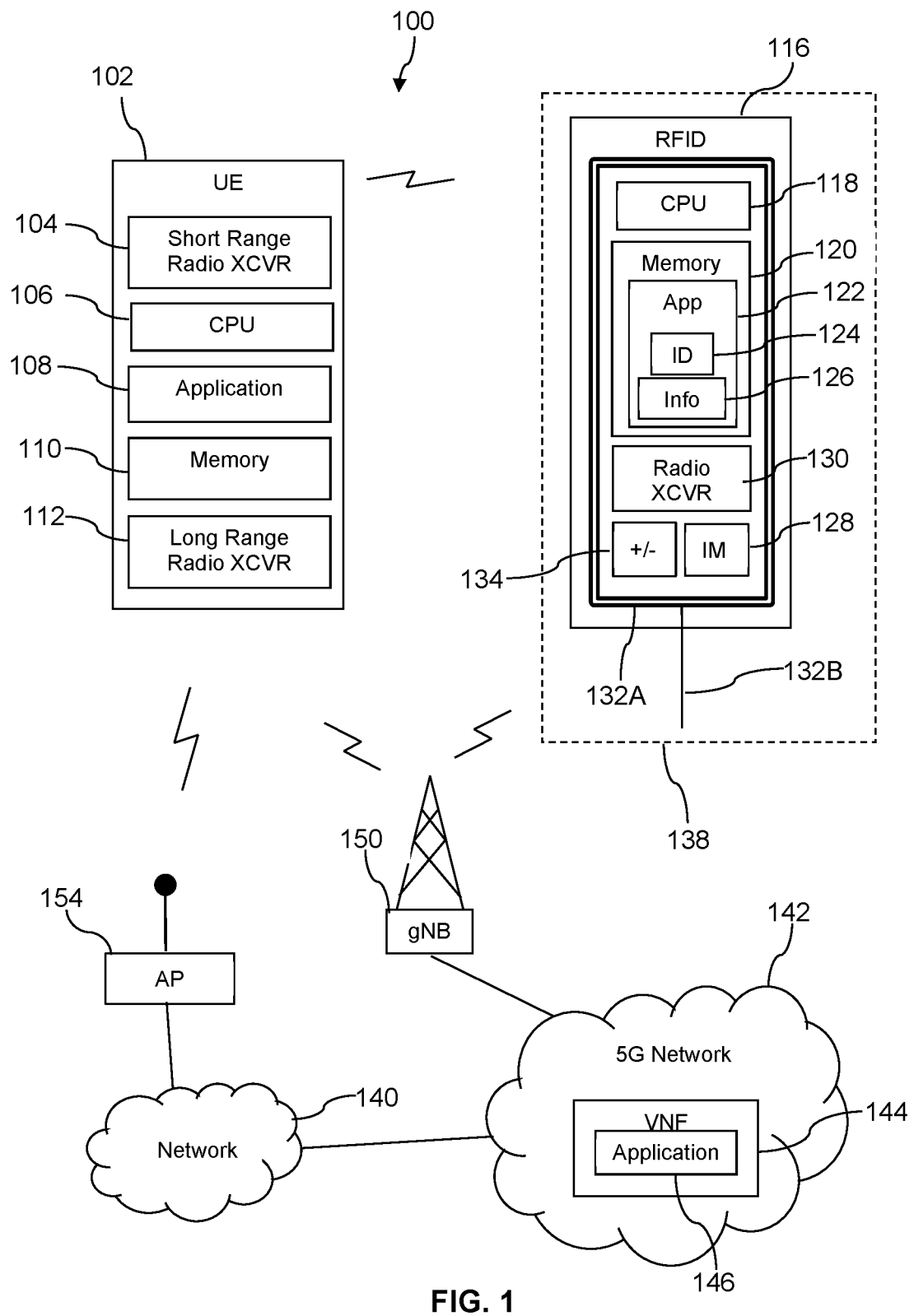
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

RFID tags can be useful with inventory control, identification, and location. RFID tags broadcast a unique identifier when energized with an electromagnetic field. Typically, an RFID tag interacts with an RFID tag reader that can be a handheld device or mounted within the equipment. The RFID tag reader can excite the tag with radio frequency (RF) energy when activated a short distance from the tag. Passive RFID tags are typically used for inventory where a tag can reveal the identity of an item associated with the tag, the contents of a box, or the location of the item when it passes the reader. An active RFID tag can have a longer range and provide time-based location data. An active RFID tag can indicate an identity of an item associated with the tag, where the tag is located, how long it remained there, and the path to the next location. The active RFID tag provides more information as long as the battery lasts. An active RFID tag that can be recharged has to be connected to a charging station, which is often inconvenient and unworkable.

A hybrid RFID chip can be used for identification and determining the usage of medical devices, masks, clothing, and laundered items. For example, a hybrid RFID chip can be attached to a set of bed linens that can only be laundered a set number of times in a healthcare facility. The bed linens may have a special coating with beneficial properties that has a lifecycle based on the number of times the linens are laundered. The special coating may be degraded from each laundry cycle. The hybrid RFID chip can be used to track the bed linens through the cleaning process. The bed linens could be registered at the laundry facility by a reader integrated into one or pieces of laundry equipment: a washing machine, a dryer, or a folding table. The hybrid RFID chip reader could be integrated above a door, within a laundry cart, or inside a laundry chute and activated every time the laundry passes by. The hybrid RFID chip can be sized to be placed within a seam or woven into the fabric. Multiple chips can be placed on each bed linen sheet to account for damaged chips. The identity of each RFID chip can also be encrypted with a hash to hide the identity of the chip. All of the RFID chips attached to a bedsheet, or similar article (e.g., clothing, bedsheet, towel, facemask, etc.), can be registered to the bedsheet within a database.

A fiber antenna on the chip can harvest ambient radio frequency (RF) power to provide low power for a periodic low power beacon. The fiber antenna can harvest ambient RF power from a cellular network access node or cell site signals, WiFi signals, or cell phone signals. The harvested RF power could provide enough electrical energy to transmit a low power beacon intermittently, for example every 15 seconds, every 30 seconds, every minute, every two minutes, every five minutes, or some other time period. The time periods between transmissions of the low power beacon may not be consistent but may vary based on an amount of ambient RF power available to be harvested by the fiber antenna of the chip. In an embodiment, the low power beacon does not comprise any confidential information but only announces the presence of the hybrid RFID chip. For example, the low power beacon may not indicate an identity of the hybrid RFID chip, may not indicate an identity of an article with which the hybrid RFID chip is associated. In this way the hybrid RFID chip can avoid disclosing its confidential information to eavesdropping or hacking devices while no authorized or intended scanning device is present to receive the confidential information.

A monitoring application on a cell phone or other mobile device can detect the low power beacon. The monitoring application could prompt either the short range or long range radio transceiver to broadcast sustained RF energy. Alternatively, a monitoring application can be executing on a reader integrated into equipment (e.g., laundry equipment) or mounted above a doorway. The reader can include a short range or long range radio transceiver to activate and read the hybrid RFID chips. The sustained RF energy proximate to the hybrid RFID chips can provide a higher level of RF energy to the energy harvesting antenna on the hybrid RFID chips and trigger the hybrid chips to transmit at a higher power level. The energy harvesting antenna on the hybrid RFID chip can provide a higher level of electrical power with the sustained RF signal from the mobile device. The hybrid RFID chip can broadcast the identification with a stronger signal or can connect to the mobile device to transmit the identification to the monitoring application. The mobile device can record the RFID chip identification and the mobile device location. For example, the mobile device can identify an RFID chip location as in a patient's room, in storage, or in the laundry room. The mobile device can transmit the identification and location to a server on the mobile network. The mobile device can determine the location of the hybrid RFID chips from a greater distance than a typical RFID reader can read a typical RFID chip. The location of the bed linens can be determined without disturbing a patient, sorting through a supply closet, or close contact with the potentially soiled bed linen.

In another example, a hybrid RIFD chip can be paired with an application on a mobile phone for a loyalty program for a high-end retailer. A high-end store or name brand retailer could offer a lease program for clothes where a customer pays for an article of clothes (e.g., a sweater) and the retailer offers to exchange it at the end of the fashion season or the beginning of the next season for a new sweater or a discount on a new sweater. The sweater can have one or more of the hybrid RFID chips sewn into, or attached to, the fabric that is powered or partially powered by electromagnetic radiation from cell phones and cell towers. The customer loyalty application on the mobile phone can identify the clothing by the hybrid RFID chip and record the location. The retailer can gather useful data from the application. For example, the location data of the sweater can show it has been used twelve times. The loss of active hybrid RFID chips could also indicate the number of times an article of clothing has been laundered. The retailer can send a notification through the mobile application with an offer to replace the article of clothing after the article of clothing has been laundered a predetermined number of times. The retailer can also determine that an article of clothing has not been used. For example, the mobile application can show that the sweater has not left the customer's residence since purchase. The retailer can send a notification through the mobile application with an offer to replace the sweater. The retailer can also send an offer for another article of clothing that would coordinate with the sweater in the closet. The retailer can also accept a return as unworn but without tags based on the location data. The retailer may place RFID readers capable of activating and reading the hybrid RFID chips within the stores and around a retail area (e.g., a mall). The RFID readers could be internet of things (IOT) device that detects a hybrid RFID chip, broadcasts a sustained RF signal, connects to the RFID chip, and transmits the RFID chip identity to an application on a local server or remote server.

In an embodiment, an RFID chip can emit a low power signal or a high power signal based on the power input from wireless broadcast signals. The RFID chip can consist of a processor, an application, a wireless transceiver, and an antenna tuned to harvest the ambient radiation from an access node or cell site, a WiFi access point, or a mobile device. The RFID chip can broadcast a low power beacon comprising the assigned identification number when the antenna is receiving a low power level from ambient RF. The low power beacon can be an infrequent and intermittent transmission based on the amount of ambient RF received. A user can prompt a high power broadcast from the hybrid RFID chip by sending a query from the mobile device. The query from the application sends a sustained RF signal from the mobile device that provides more RF energy and triggers a higher power transmission from the RFID chip. The higher power output signal can have a greater range and a greater periodic rate. Alternatively, an RFID reader integrated into equipment can sense an RFID chip, broadcast a sustained RF signal, and records the RFID identification.

In an embodiment, an application on the mobile device or the RFID reader can transmit the identification of the RFID chip and the location of the RFID chip to a database executing on a remote server. The database accessed by the application can be a permissioned blockchain method to ensure information remains secure and unaltered. Permissioned blockchain, also called a private blockchain, are blockchain networks that require authentication credentials to access. The permissioned blockchain can be located on a private server or private network. The application on the mobile device can establish a secure connection to the blockchain database. The data (e.g., location, RFID identity, user identity, and timestamp) can be recorded as a blockchain entry. The application on the server would record the data set, hash the data set, provide a timestamp, and submit the entry into the blockchain ledger. Storing the data set as a blockchain entry would prevent the data set from being tampered with, edited, or being corrupted. Saving data from a multitude of devices into a blockchain ledger can use substantial computing resources, and a virtual network slice on a 5G network can provide a scalable platform for the computing resources needed. The user device applications can connect directly to the 5G network or utilize a user node (e.g., WiFi modem) to securely connect.

While two different hybrid RFID chip use cases were described above (e.g., monitoring uses of personal protection equipment (PPE) and bed linens and managing leasing of clothes by a retail store), it will be appreciated that the hybrid RFID chip may advantageously be applied in many other use cases. The hybrid RFID chip described herein provides technical solutions to one or more technical problem. By operating in two different modes—each mode relying upon a different electrical power harvesting approach—a problem of securing the identity or other information to be transmitted by the hybrid RFID chip is overcome. When relying on power it harvests from ambient electromagnetic field energy, for example ambient cellular radio signals, the hybrid RFID chip remains mute about its potentially confidential information and only announces its presence, thereby keeping the potentially confidential information secure. When an authorized or intended scanner or reader detects the presence of the hybrid RFID chip (e.g., it receives the announcement of the presence of the hybrid RFID chip, it receives the beacon signal of the hybrid RFID chip), it can transmit a higher energy electromagnetic field to the hybrid RFID chip, causing the hybrid RFID chip to transition to operate in a different, higher power mode in which it does transmit its stored information (potentially but not necessarily confidential information) to the authorized or intended scanner or reader. While it is possible that eavesdropping or hacking devices may also receive this stored information, if they are present in the vicinity, the exposure of the information transmitted by the hybrid RFID chip is significantly reduced, and therefore more securely protected, by making this exposure occur only over a short time duration. In an embodiment, the hybrid RFID chip may transmit its information (possibly confidential information) only once or only for a limited time duration. In an embodiment, the hybrid RFID chip may transmit its information in the presence of the high energy electromagnetic field until the authorized or intended scanner or reader transmits a message to the hybrid RFID chip that causes it to stop transmitting its information, for example the scanner or reader may send an acknowledgement to the hybrid RFID chip that causes it to stop transmitting its information until it first transitions back into the low power mode of operation.

Turning now to FIG. 1, a dual power RFID communication system 100 is described. In an embodiment, the dual power RFID communication system 100 comprises a user equipment (UE) 102, an RFID chip 116, an access node 150, a short-range access point (AP) 154, a network 140, and a 5G core network 142. The RFID chip 116 can wirelessly communicate with the UE 102 that can communicatively connect to remote application 146 executing on 5G core network 142, as will be described herein.

The dual power RFID chip 116 can include a processor 118, a memory 120, a short-range radio transceiver 130, an identification application 122, an identification 124, an information store 126, an energy harvesting antenna 132, an impedance circuit 128, and an energy storage device 134. A portion of the memory 120 may be non-transitory memory and a portion of the memory 120 may be transitory memory. The RFID chip 116 may have a processor 118 running an identification application 122 stored in memory 120 that utilizes the short-range radio transceiver 130. The RFID chip 116 can have a two-part energy harvesting antenna 132 with a shaped portion 132A and a thread portion 132B. The energy harvesting antenna 132 or a portion of the antenna can be an internal antenna 132A or external antenna 132B. The energy harvesting antenna 132 and impedance circuit 128 can harvest ambient RF energy from a spectrum of electromagnetic energy, for example, 2.402 GHz to 2.480 GHz, 2.400 GHz to 2.4835 GHz, 2.401 GHz to 2.495 GHz, 698 MHz to 746 MHz, 814 MHz to 894 MHz, 1.710 GHz to 2.200 GHz, 1.85 GHz to 1.995 GHz, 3.550 GHz to 3.700 GHz, 5.150 GHz to 5.925 GHz, 617 MHz to 698 MHz, 2.496 GHz to 2.69 GHz, 26.5 GHz to 29.5 GHz, or 37.0 GHz to 40.0 GHz. The electrical energy harvested can measure in a range of one milliwatt to 50 milliwatts. The impedance circuit 128 can include one or more capacitors, rectifiers, and radiofrequency to direct current converters to provide electrical energy to the processor 118 or store the electrical energy in an energy storage device 134. The energy storage device 134 may be one or more capacitors, batteries, or a combination of both. The RFID chip 116 can have a short-range radio transceiver 130 that may produce an RF signal on the same frequency as the power harvesting antenna. Alternatively, the short-range radio transceiver 130 may produce an RF signal on a different frequency, for example, using Bluetooth® wireless signal or a WiFi wireless signal. Bluetooth® wireless signals are typically 2.402 GHz to 2.480 GHz short-range, low power wireless RF signals that follow a standard protocol managed by the Bluetooth® Special Interest Group (SIG). WiFi wireless signals commonly use the 2.4 GHz, 3.65 GHz, 5 GHz, and 5.9 GHz short-range wireless signals that follow the IEEE 802.11 protocol family. Bluetooth® and WiFi share the 2.4 GHz band, so the short-range radio transceiver 130 may connect to both Bluetooth® and WiFi simultaneously. The RFID chip 116 may be embedded or installed inside a container 138. The container 138, also referred to as an article 138, may be an assembly, equipment, a monitoring device, a housing, an item, a label, or an article 138 made of textile fabric.

The RFID chip 116 can broadcast the identification 124 using the short-range radio transceiver 130. The RFID chip 116 can periodically broadcast the identification 124 depending on the amount of energy harvested by the energy harvesting antenna 132. The processor 118 can prompt the identification application 122 to broadcast the identification 124 with a low periodic frequency based on a low level of energy harvesting and with a higher periodic frequency based on a higher level of energy harvesting. The identification application 122 can broadcast the identification 124 with a high power level or with a greater range when an RF energy source is directed towards the RFID chip 116. In an embodiment, the RFID chip 116 can transmit a beacon without the identification 124 with a low periodic frequency based on a low level of energy harvesting. A high level of energy harvesting from a proximate RF energy source can trigger the identification application 122 to communicatively connect to the UE 102, authorize the UE 102, and transmit the identification 124 to protect the identification 124 and information 126.

The UE 102 may detect the RF signal broadcast from the RFID chip 116 with a short-range radio transceiver 104. The UE 102 may be a smartphone, a mobile phone, a laptop computer, a tablet computer, a wearable computer, a headset computer, a wireless handset, a personal digital assistant (PDA), a gaming device, a pager, a media player, or a computer. The UE 102 may be an RFID reader integrated into, attached to, or connected to equipment. For example, the UE 102 may be an RFID reader integrated into laundry equipment: a washer, a dryer, and a folding table. The UE 102 may be an RFID reader integrated into a location that an article would pass: a doorway, a portal, a cart, a chute, a beltway, or a storage location. The UE 102 may include short-range radio transceiver 104, a processor 106, memory 110, one or more monitoring applications 108, and the long-range radio transceiver 112. The UE 102 may include a display, a touchscreen display having a touch-sensitive surface for input by a user, a keyboard for input by a user, or a microphone for audio input by a user. The monitoring application 108 may be loaded in a non-transitory portion of the memory 110 and running in the background or require explicit instructions to connect. The short-range radio transceiver 104 may be able to establish wireless communication with Bluetooth, WiFi, or other low power wireless RF signals such as: ZigBee, Z-Wave, 6LoWPan, Thread, and WiFi-ah. The long-range radio transceiver 112 may be able to establish wireless communication with an access node 150 based on a 5G, a long term evolution (LTE), a code division multiple access (CDMA), or a global system for mobile communications (GSM) telecommunications protocol. In some contexts the access node 150 may be referred to as a gigabit enhanced node B (gNB), a cell site, or a cell tower.

The RFID chip 116 can broadcast the identification 124 with a low power RF signal and at a low periodic rate. The UE 102 can detect the identification 124 broadcasted with the low power signal by the monitoring application 108 executing in memory 120. The monitoring application 108 can direct the UE 102 to transmit a sustained RF signal with either the short-range radio transceiver 104 or the long-range radio transceiver 112 to excite the energy harvesting antenna 132 of the RFID chip 116. The monitoring application 108 can select to utilize the radio transceiver (either 104 or 112) based on the receivable frequency of the energy harvesting antenna 132 of the RFID chip 116. The sustained RF power from the UE 102 proximate to the RFID chip 116 can prompt the identification application 122 to broadcast the identification 124 and additional information 126 at a higher power level and greater frequency. The additional information 126 can consist of manufacturing information (e.g., model, type, manufacturing date, material type, or coating type) related to the article 138. In an embodiment, the RFID chip 116 can broadcast a low power beacon without the identification 124. The beacon can broadcast on a low power RF frequency (e.g., Bluetooth) and at a low periodic rate. The UE 102 can detect the beacon with the monitoring application 108 and transmit a sustained RF signal to excite the energy harvesting antenna 132 of the RFID chip 116. The RFID chip 116 can harvest and store the RF signal from the UE 102 in the energy storage device 134. When the processor 118 detects the second electrical energy level in the energy storage device 134, the processor 118 can establish a wireless connection to the UE 102 to transmit the identification 124 to the monitoring application 108. Alternatively, the RFID chip 116 can transmit the identification 124 and information 126 to the monitoring application 108 after establishing a wireless connection to the UE 102.

The dual power RFID communication system 100 may include a short-range access point (AP) 154. The AP 154 may provide the UE 102 a wireless communication link via the short-range radio transceiver 104 to a network 140. The network 140 is one or more public networks, one or more private networks, or a combination thereof. The UE 102 can establish a wireless communication link to the AP 154 and thereby communicatively couple the UE 102 to the 5G core network 142 via network 140. The AP 154 may produce a short-range RF signal, for example, using a Bluetooth® wireless signal or a WiFi wireless signal.

The access node 150 may provide a wireless communication link to the UE 102 and couple the UE 102 to the 5G core network 142. The access node 150 may provide the wireless communication link using one or more wireless protocols. For example, the access node 150 may communicate according to a 5G, 5G new radio, a long term evolution (LTE), a code division multiple access (CDMA), or a global system for mobile communications (GSM) wireless communication protocol.

The 5G core network 142 can operate as a network function virtualization (NFV) with one or more virtual network functions (VNF) 144 available for computing services such as remote application 146. The UE 102 may communicate via the access node 150 to communicatively couple to remote application 146 executing on VNF 144. Alternatively, the UE 102 can communicate via the AP 154, via the network 140 and the 5G core network 142, to communicatively couple to the remote application 146 executing on VNF 144. The VNF 144 can operate on a network slice on the 5G core network 142 described in more detail further hereinafter.

The communication link between the UE 102 and the VNF 144 may allow data to be transferred to one or more remote applications 146 executing on VNF 144. The data stored within the non-transitory memory 110 of the UE 102 may be transferred by the monitoring application 108 via the long-range radio transceiver 112 and the access node 150 to the 5G core network 142 and to the remote application 146 executing on the VNF 144. The remote application 146 may process the data or can transfer the data to another VNF 144 within the 5G core network 142. The data received by the monitoring application 108 may include the identification 124 and the information 126 from the RFID chip 116. The data received by the monitoring application 108 can also include a unique identifier, timestamp, date stamp, and location data from the UE 102. The remote application 146 executing on VNF 144 may execute a command based on the data received or based on other input received. The remote application 146 may send data through the communication link to the monitoring application 108 on the UE 102. The data may include instructions or communication for the monitoring application 108 on the UE 102.

Figure 2:
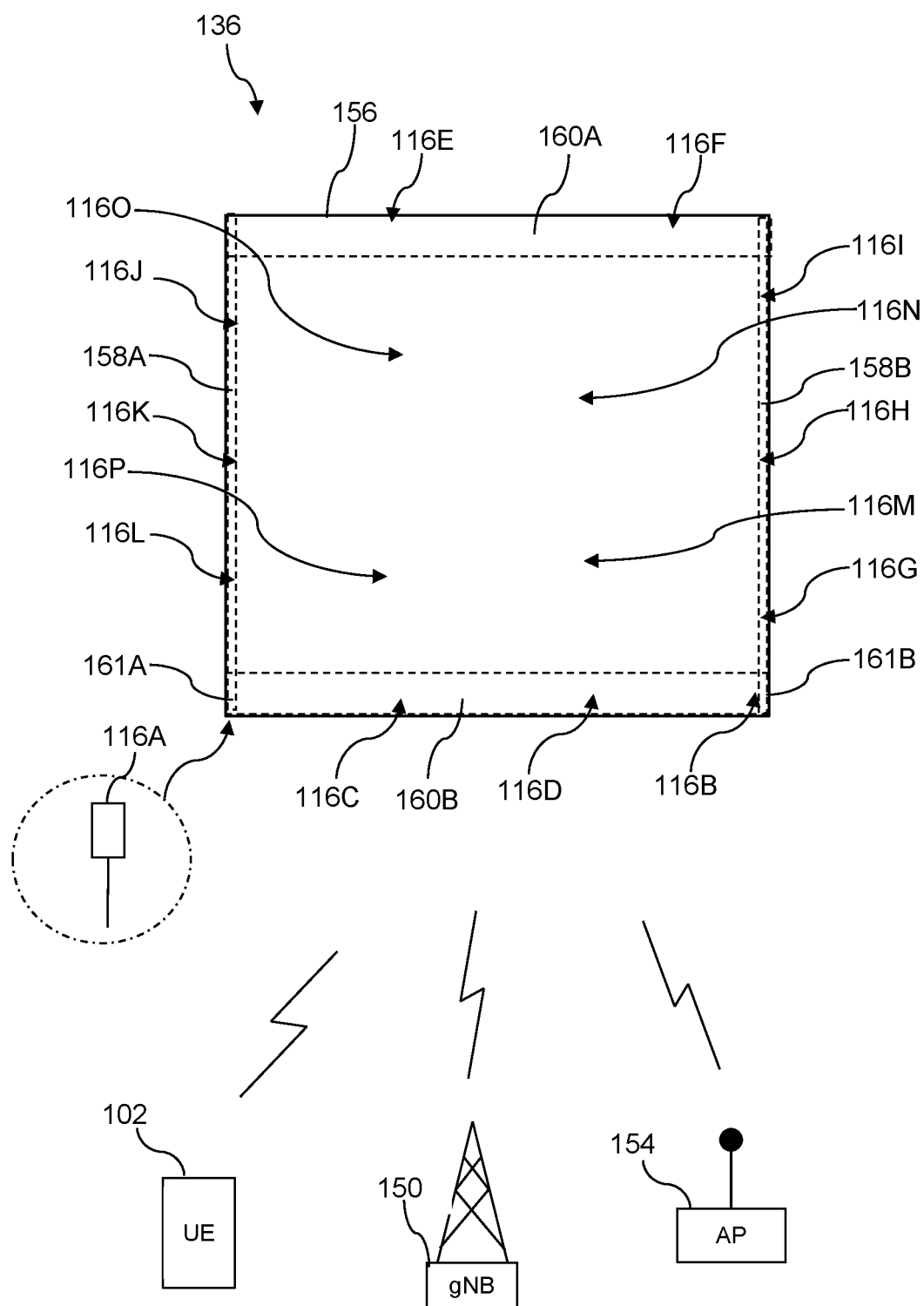
FIG. 2 is a block diagram of a textile fabric system according to an embodiment of the disclosure.

Turning now to FIG. 2, a textile fabric system 136 is described. In an embodiment, the textile fabric system 136 comprises an article 156 made of textile cloth with a plurality of RFID chips 116, a UE 102, an access node 150, and an AP 154. A plurality of RFID chips 116 can be distributed within locations where the fabric has been folded, joined, and attached (i.e., sewn) about article 156. Each of the RFID chips 116 can have a unique identification 124 that is registered to the article 156. The article 156 can be an article of clothing, a part of a bed linen set (e.g., flat sheet, fitted sheet, pillowcase), a towel (e.g., face cloth, hand towel, a bath towel, or beach blanket), footwear, or a piece of cloth. The article 156 can be personal protective equipment made from textile fabric such as a facemask, a head covering, footwear covering, scrubs, protective shirt, protective pants, apron, flame resistant clothing, and gloves. Each article 156 can have a plurality of RFID chips 116 with unique identification 124 registered to the article 156 so that different articles 156 can be distinguished from each other based on the identification 124 of each RFID chip 116. In the example shown, article 156 is a bedsheet 156 with a plurality of RFID chips 116 A-P sewn into, woven into, or similarly incorporated into the bedsheet 156. In an embodiment, the RFID chip 116 can be the size of a grain of rice. Alternatively, the RFID chip 116 can be the size of a red pepper flake. Alternatively, the RFID chip 116 can be the size of a black pepper flake. The RFID chip 116 G-L can be sewn into a narrow side seam 158A and 158B. The RFID chip 116 C-F can be sewn into a wide side seam 160A and 160B. The RFID chip 116 A-B can be sewn into a corner seam 161A and 161B. The RFID chip 116 M-P can be woven into the fabric and distributed about a pattern (e.g., RFID chips per square foot). The RFID chips 116 can be placed within pockets or patches sewn into, glued onto, or otherwise attached to the bedsheet 156. Although a bedsheet 156 is shown, similar attachment techniques could apply to any article made of textile fabric, scrubs, facemasks, shoe covering, head covering, bed linens, towels, or any other item made from cloth.

The plurality of RFID chips 116A-P can broadcast the identifications 124A-P at a periodic rate depending on the amount of RF energy received. Alternatively, the plurality of RFID chips 116A-P can broadcast a low power beacon at a periodic rate depending on the amount of RF energy received. The identifications 124A-P of each RFID chip 116A-P can be unique and registered to the article 156. In an embodiment, the identifications 124A-P of each RFID chip 116A-P can be same. The distribution of RFID chips 116A-P about the fabric of the clothing or bed linens can maximize the number of RFID chips 116A-P receiving ambient RF power from the access node 150, the AP 154, or UE 102. The number and distribution of RFID chips 116 can also increase the probability that at least one of the RFID chips 116 can receive RF energy when folded and placed in storage, installed for use, hanging in a closet, or crumpled in a basket. The monitoring application 108 on the UE 102 can receive the identification 124 and can prompt the long-range radio transceiver 112 to emit a sustained RF signal to increase the amount of RF energy proximate to the RFID chips 116A-P. The increased amount of RF energy can provide one or more RFID chips 116A-P a second electrical energy level (e.g., a higher energy level) to broadcast the identification 124 with a greater range and frequency. The monitoring application 108 can receive the identification 124 from one or more RFID chips 116, store the data in non-transitory memory 110, and transmit the data to a remote application 146 executing on a VNF 144. The monitoring application 108 can communicatively connect to the remote application 146 executing on VNF 144 of the 5G core network 142. The monitoring application 108 can transmit the data stored in memory 110 to the remote application 146.

Figure 3:
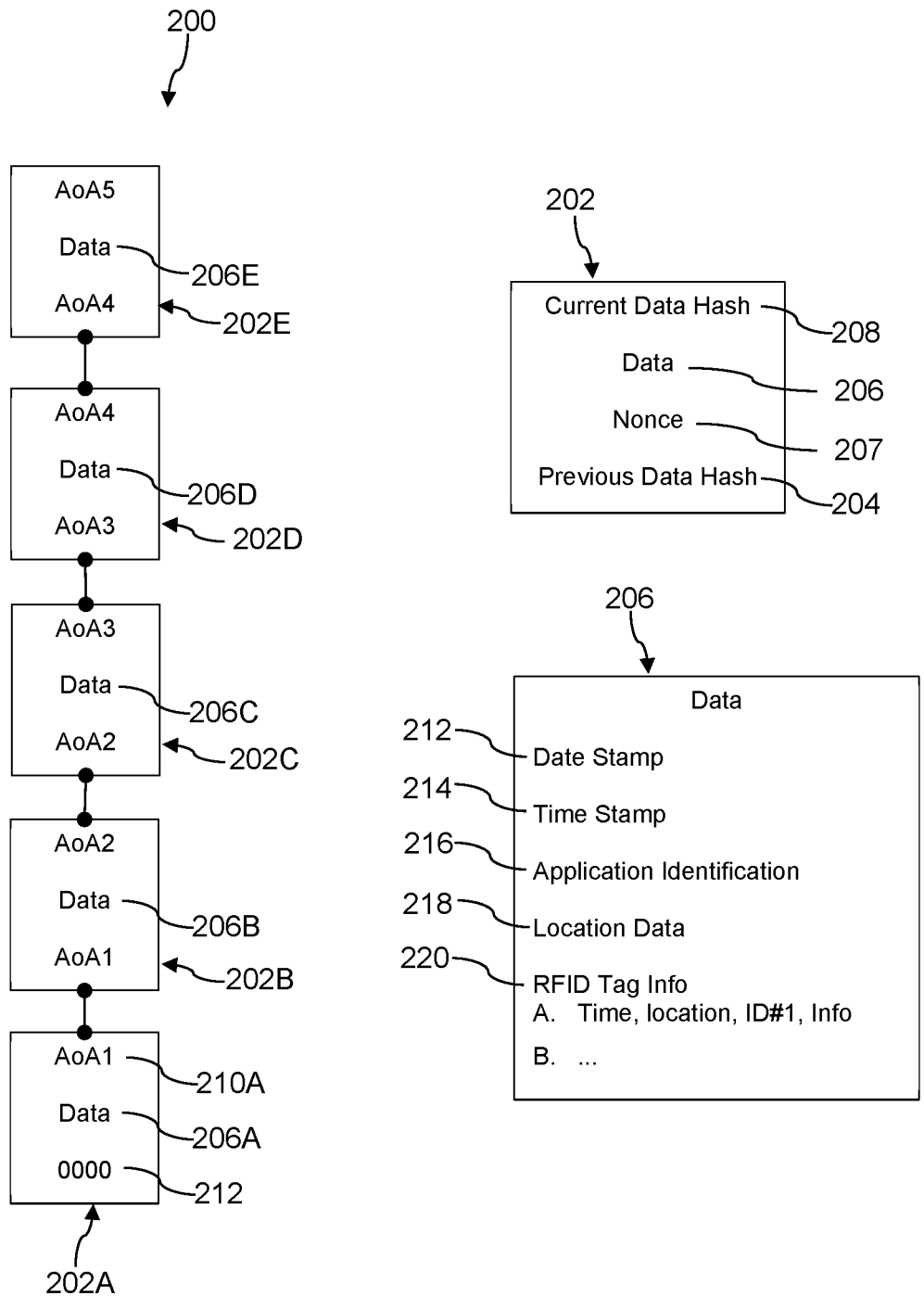
FIG. 3 is a block diagram of a blockchain database according to an embodiment of the disclosure.

Turning now to FIG. 3, the remote application 146 executing on VNF 144 of the 5G core network 142 can save the data received from the monitoring application 108 on the UE 102 in a data record 202 of a blockchain 200. The application data 206 can comprise a date stamp 212, a time stamp 214, the application identification 216, the location data 218, and the information data set 220 of the RFID chip 116. The date stamp 212 and time stamp 214 can be the time of transmission of the data set and determined from the UE 102. The application identification 216 can identify any combination of the user, the UE 102, and the monitoring application 108. The location data 218 can be the location of the UE 102 determined by the connection to an AP 154, and one or more access nodes 150. The information data set 220 can comprise a timestamp, location, identification 124, and information 126 of each RFID chip 116A-P. Although the RFID chip information from one RFID chip is illustrated, the information data set 220 can have one, two, three, or a plurality of data gathered from RFID chips 116. Although the application data 206 is formatted with an information data set 220 gathered from multiple RFID chips, the application data 206 can consist of information data set 220 formatted for data gathered from one RFID chip. The application data 206 can be saved by remote application 146 into a blockchain 200. The blockchain 200 consists of multiple data records 202 saved with a sequential method referred to as a chain. Each data record 202 consists of a single instance of application data 206, a nonce 207, a previous data hash 204, and the current data hash 208. A nonce 207 is a number or alphanumeric character string added to the data record 202 to achieve a desired effect on the current data hash 208. A hash is produced by a hash function of the application data 206 and saved as current data hash 208. A hash function is a type of processing method that produces a fixed-length character string (e.g., 64 characters of text) from any size of an input file or text string. In an example shown, a current data hash 210 is illustrated with four characters: "AoA1" where the "Ao" identifies the type of hash function used, and the remaining two characters illustrate the fixed-length character field. The hash (current data hash 210) of the application data 206 does not replace the contents of the file but represents the file with a unique character string identifier. The nonce 207 may be selected by the hash function to achieve an effect on the current data hash 208 such as ending the hash with two zeros (e.g., 00). For example, a nonce of "23789" may change the current hash from "AoA1" to "AoA100". The unique character string created by the hash function cannot be decrypted. Said another way, the original file cannot be reconstructed from the unique character string. Hash functions are well-known encryption methods (e.g., SHA256, MD5, Bcrypt, and RIPEMD).

The hash of the application data 206 with the nonce 207 can be used to identify the sequence of data records where the previous data record is written inside a current data record. By placing a previous data hash 204, in the example "AoA1" in the data record 202B, the remote application 146 identifies that data record 202B is a sequential record with data record 202A. The application data 206 cannot be altered after being written into the data record 202 because a hash of the application data 206 has been saved in the data record 202 as current data hash 208. A change to the data of the application data 206 would change the current data hash 208, and the next entry of application data would no longer be sequential. A change in the application data 206 would cause the blockchain to break. In the example shown, data record 202A can be the first or genesis data record with a previous data hash 204 of "0000". The genesis data record 202A can indicate a new user or a UE 102 with a new or unique monitoring application 108. The current data hash 210 "AoA1" can be the hash of the data content 206A. The second data record 202B can contain the data content 206B with the current data hash "AoA2" of data content 206B and previous data hash 204 ("AoA1") identifying data record 202B as being sequential in order to data record 202A. The third data record 202C can contain the data content 206C with the current data hash "AoA3" of data content 206C and previous data hash 204 ("AoA2") identifying data record 202C as being sequential in order to data record 202B. The fourth data record 202D can contain the data content 206D with the current data hash "AoA4" of data content 206D and previous data hash 204 ("AoA3") identifying data record 202D as being sequential in order to data record 202C. The fifth data record 202E can contain the data content 206E with the current data hash "AoA5" of data content 206E and previous data hash 204 ("AoA4") identifying data record 202E as being sequential in order to data record 202D. The sequence of data records 202A-E are linked sequentially with the current data hash 208 and the previous data hash 204. Although the blockchain 200 in FIG. 5 shows five data records 202A-E, the blockchain 200 can have 5, 50, 500, 5000, 50,000, or any number of data records 202.

Returning to FIG. 1 with reference to FIG. 2, the RFID chip 116 can trigger a usage event and a notification to the UE 102. In the previous example, article 138 can be a bedsheet 156 that has been cleaned and folded in a laundry room in a health care facility. The monitoring application 108 can receive the identification 124 broadcasts from one or more RFID chips 116. The monitoring application 108 on the UE 102 can prompt the long-range radio transceiver 112 to emit a sustained signal to increase the amount of RF energy directed towards, or proximate to, the RFID chips 116A-P. The monitoring application 108 can receive the identification 124 and in some cases, the information 126 from more of the RFID chips 116, store the data in non-transitory memory 110 and transmit the data to a remote application 146 executing on VNF 144 by establishing a wireless communication link with the access node 150. The remote application 146 can save the identification 124 and the information 126 from the RFID chip 116, along with the location of the UE 102 into a blockchain 200. The remote application 146 can compare application data 206 written to the blockchain 200 with previous data packages 206A-E on the blockchain 200 to determine an event record. The comparison may include the identification 124 and the location data of the UE 102 in one or more application data 206 in the blockchain 200 to determine an event record. The event record can be a usage of article 138. In this example, the remote application 146 can determine that bedsheet 156 has been laundered based on the identity of the UE 102, the location data (e.g., the laundry room), and the time stamp. The remote application 146 can determine that the laundered bedsheet 156 has reached the limit of washings and should be removed from service. The remote application 146 can send an event notification (e.g., a text or an e-mail) to the monitoring application 108 requesting that the bedsheet be removed from service. The event record can be the number of times an item or article has been used. The event record can be the absence of usage.

Figure 4:
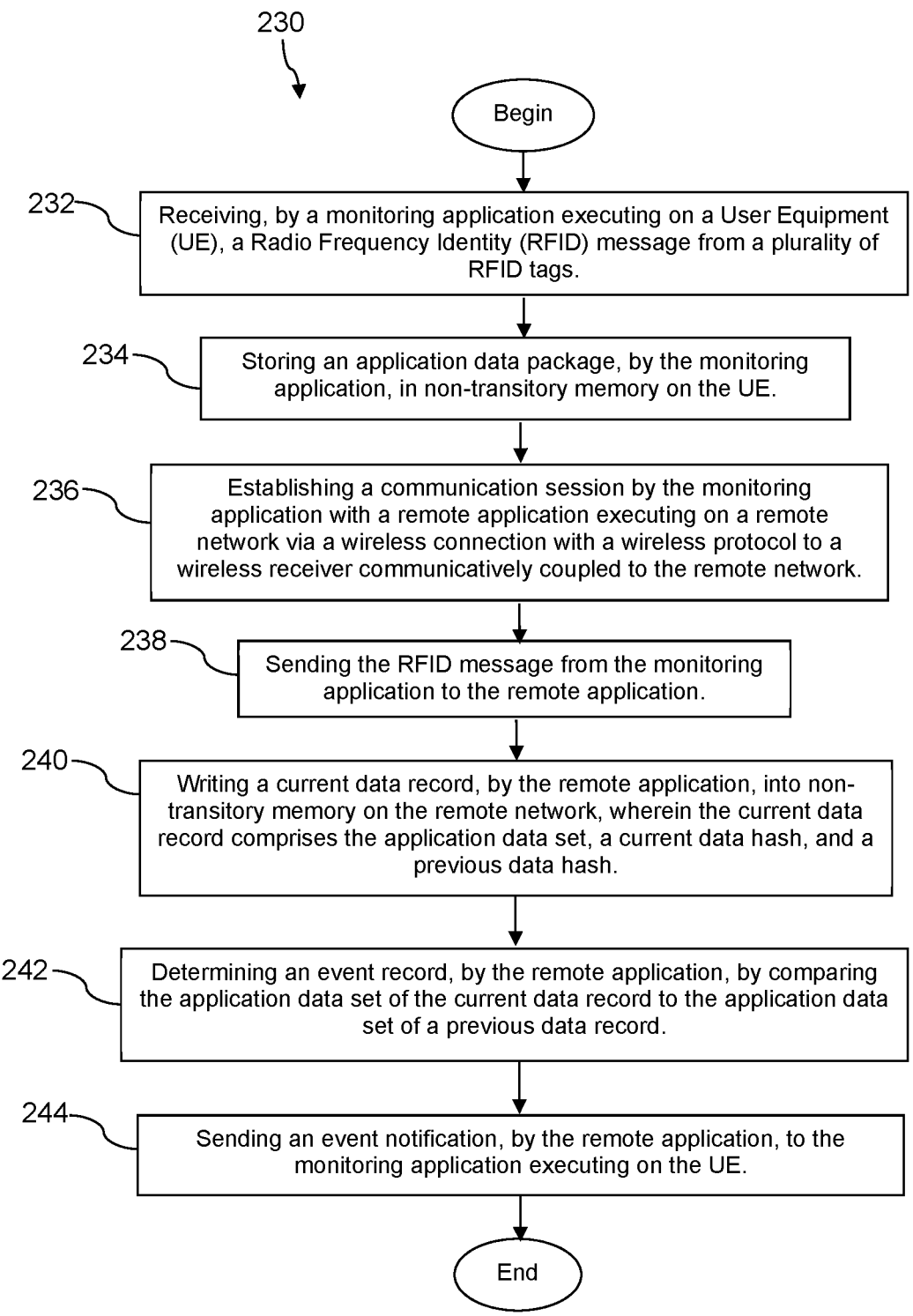
FIG. 4 is a flow chart of a method according to an embodiment of the disclosure.

Turning now to FIG. 4, a method 230 is described. In an embodiment, the method 230 is a method of determining usage of an article based on communicating data from a User Equipment (UE). At block 232, the method 230 comprises receiving, by a monitoring application executing on a UE, an RFID message from a plurality of RFID tags. In an embodiment, the RFID message comprises one of an RFID identification or an RFID information.

At block 234, the method 230 comprises storing an application data package, by the monitoring application, in non-transitory memory on the UE. In an embodiment, the application data package comprises an RFID message, an application identification, a date stamp, a timestamp, and a location data set by the UE.

At block 236, the method 230 comprises establishing a communication session by the monitoring application with a remote application executing on a remote network via a wireless connection with a wireless protocol to a wireless receiver communicatively coupled to the remote network. In an embodiment, the remote network comprises a virtual network function located on a slice of a 5G network. At block 238, the method 230 comprises sending the RFID message from the monitoring application to the remote application.

At block 240, the method 230 comprises writing a current data record, by the remote application, into non-transitory memory on the remote network, wherein the current data record comprises the application data set, a current data hash, and a previous data hash. In an embodiment, the current data hash is determined by a hash function of the application data set by the remote application, wherein the current data hash is written to the current data record by the remote application. In an embodiment, the previous data hash is a current data hash from a previous data record, wherein the previous data hash is written to the current data record by the remote application. In an embodiment, the current data record is sequential to the previous data record.

At block 242, the method 230 comprises determining an event record, by the remote application, by comparing the application data set of the current data record to the application data set of a previous data record.

At block 244, the method 230 comprises sending an event notification, by the remote application, to the monitoring application executing on the UE.

Figure 5A:
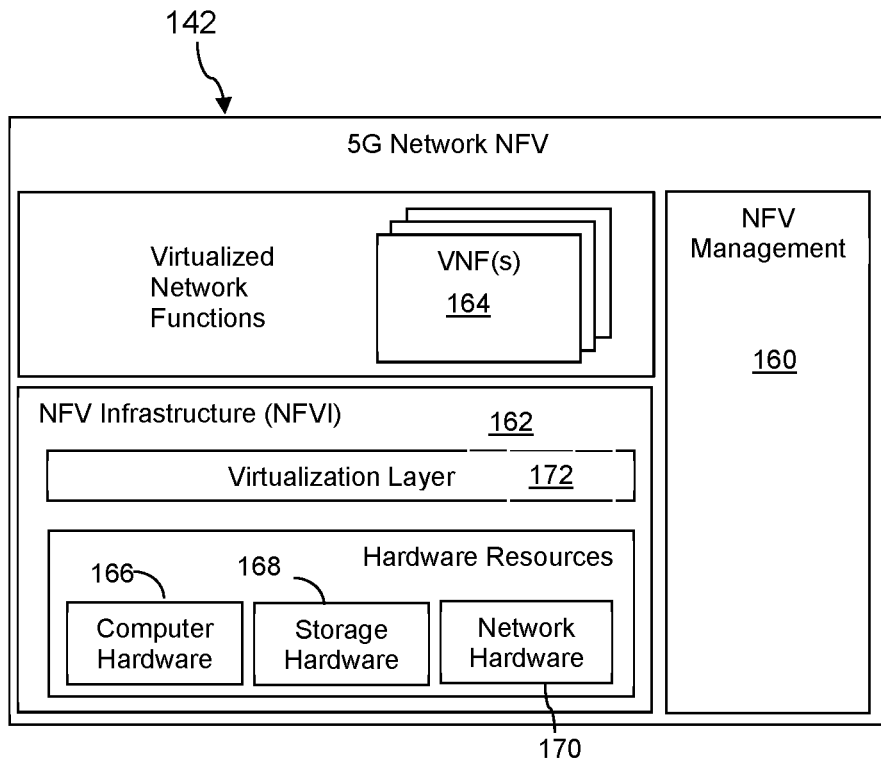
FIG. 5A is a block diagram of a 5G network function virtualization according to an embodiment of the disclosure.

Turning now to FIG. 5A, the 5G core network 142 comprises a network function virtualization (NFV) system that is more fully described by ETSI GS NFV 002 v1.2.1 (2014-12). The NFV includes the NFV management 160, NVF infrastructure 162, and a plurality of virtualized network functions (VNF) 164. NFV management 160 can control the lifecycle management of one or more VNFs 164. The lifecycle management can include the creation, management, and dissolution of the VNFs 164. The one or more VNFs 164 include the software implementations of a network function that a computing service may execute within. The NVF infrastructure 162 includes computer hardware 166, storage hardware 168, network hardware 170, and a virtualization layer 172. The computer hardware 166 can include single or multiple commercial servers. The storage hardware 168 can include standard hard-drives, solid-state drives, optical storage devices, or any combination thereof. The network hardware 170 can comprise various commercial routers and switch hardware. The virtualization layer 172 decouples the hardware resources (i.e., computing hardware 166, storage hardware 168, and network hardware 170) by abstracting the hardware resources as software functions. The virtualization layer 172 offers standardized interfaces so that the VNF performance can be independent of the hardware resources. The NFV of the 5G core network 142 creates a virtual environment that can support computing services regardless of the platform or operating system needed for the computing service.

Figure 5B:
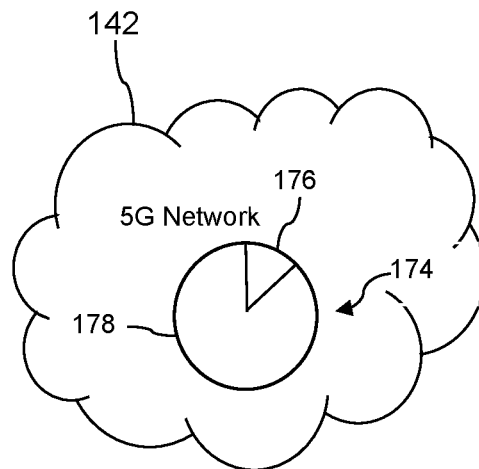
FIG. 5B is an illustration of a network slice from a 5G network function virtualization according to an embodiment of the disclosure.

Turning now to FIG. 5B with reference to FIG. 4A, the 5G core network 142 is illustrated by a cloud form as the NFV of the 5G core network 142 can function as a computing service, a storage service, or a network service depending on the configuration of each VNF 164. The total volume of computing availability 174 of the NFV of the 5G core network 142 is illustratively represented by a pie chart with a portion illustrated as a slice 176 and the remaining availability 178. The slice 176 represents the computing volume reserved for a computing service. The computing volume of the slice 176 can be measured by any combination of the processing capacity of the computing hardware 166 (e.g., CPU capacity), the storage capacity of the storage hardware 168 (e.g., terabytes of data), and the throughput of the network hardware 170 (e.g., link bandwidth).

Figure 6:
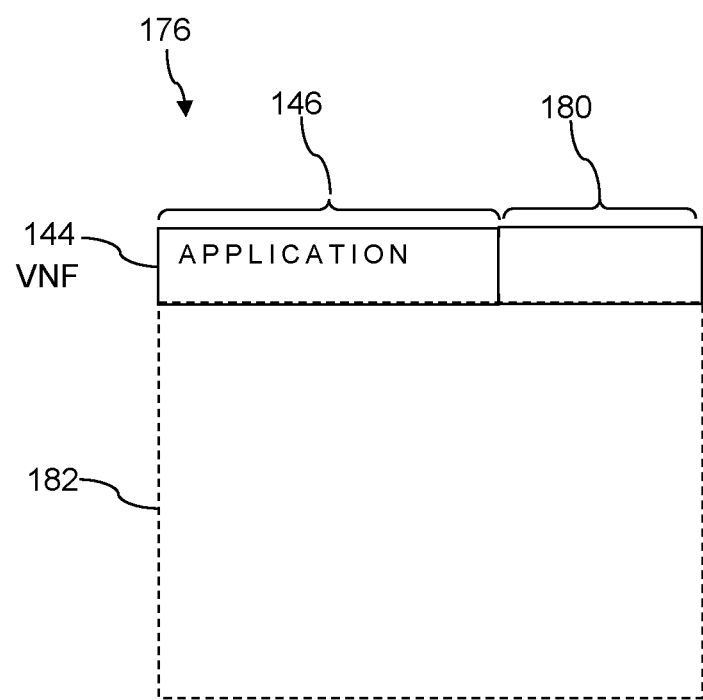
FIG. 6 is a block diagram of an application within a virtual network function on a network slice according to an embodiment of the disclosure.

Turning now to FIG. 6, the slice 176 can comprise a VNF 144 and an unallocated portion 182. A remote application 146 with additional computing volume 180 can execute on VNF 144. The unallocated portion 182 can represent computing volume reserved for future use. Although one VNF is illustrated, the slice 176 can have two VNFs or a plurality of VNFs. The remote application 146 executing in VNF 144 can be configured to communicate with or share data with a plurality of applications and a plurality of VNFs. Although the slice 176 is illustrated with VNF 144 and an unallocated portion 182, the slice 176 can be configured without an unallocated portion 182. Although only one remote application 146 is described as executing within the VNF 144, two or more applications can be executing within the VNF 144.

Figure 7:
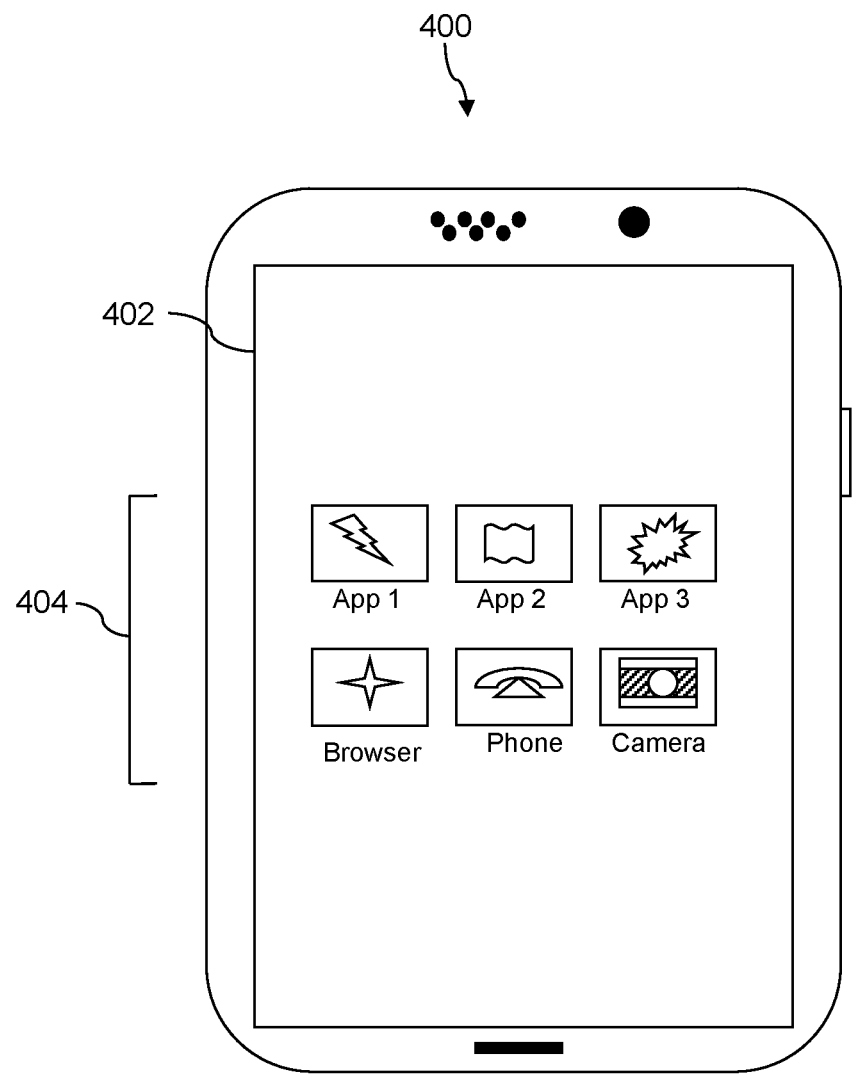
FIG. 7 is an illustration of a mobile communication device according to an embodiment of the disclosure.

FIG. 7 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400, or any other wireless communication network or system.

Figure 8:
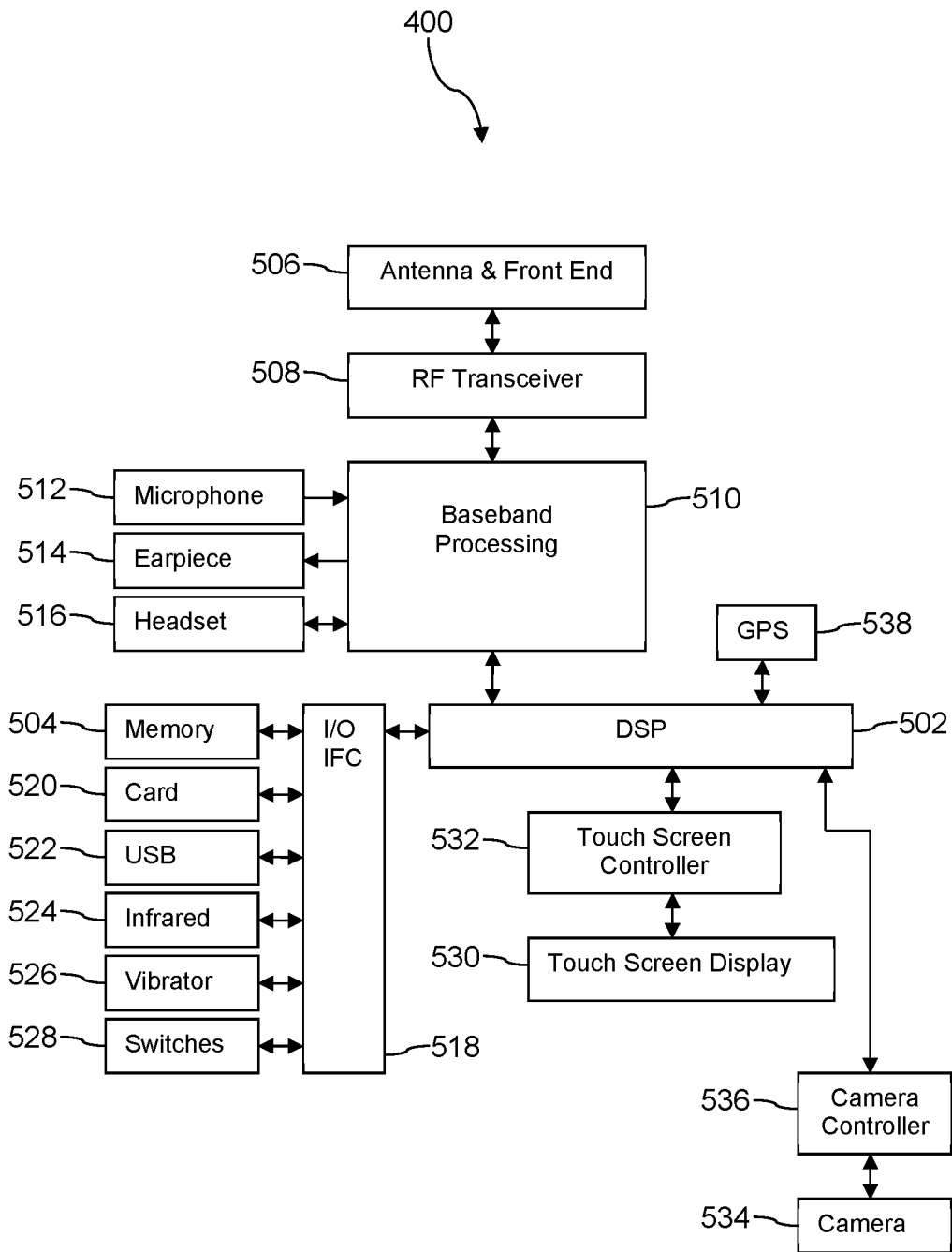
FIG. 8 is a block diagram of a hardware architecture of a mobile communication device according to an embodiment of the disclosure.

FIG. 8 shows a block diagram of the UE 400. While a variety of known components of handsets are depicted, in an embodiment, a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch-sensitive screen. In an embodiment, the UE 400 may include both the touch screen display 530 and additional display component that does not provide a touch-sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer systems. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identification (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example, coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 9A:
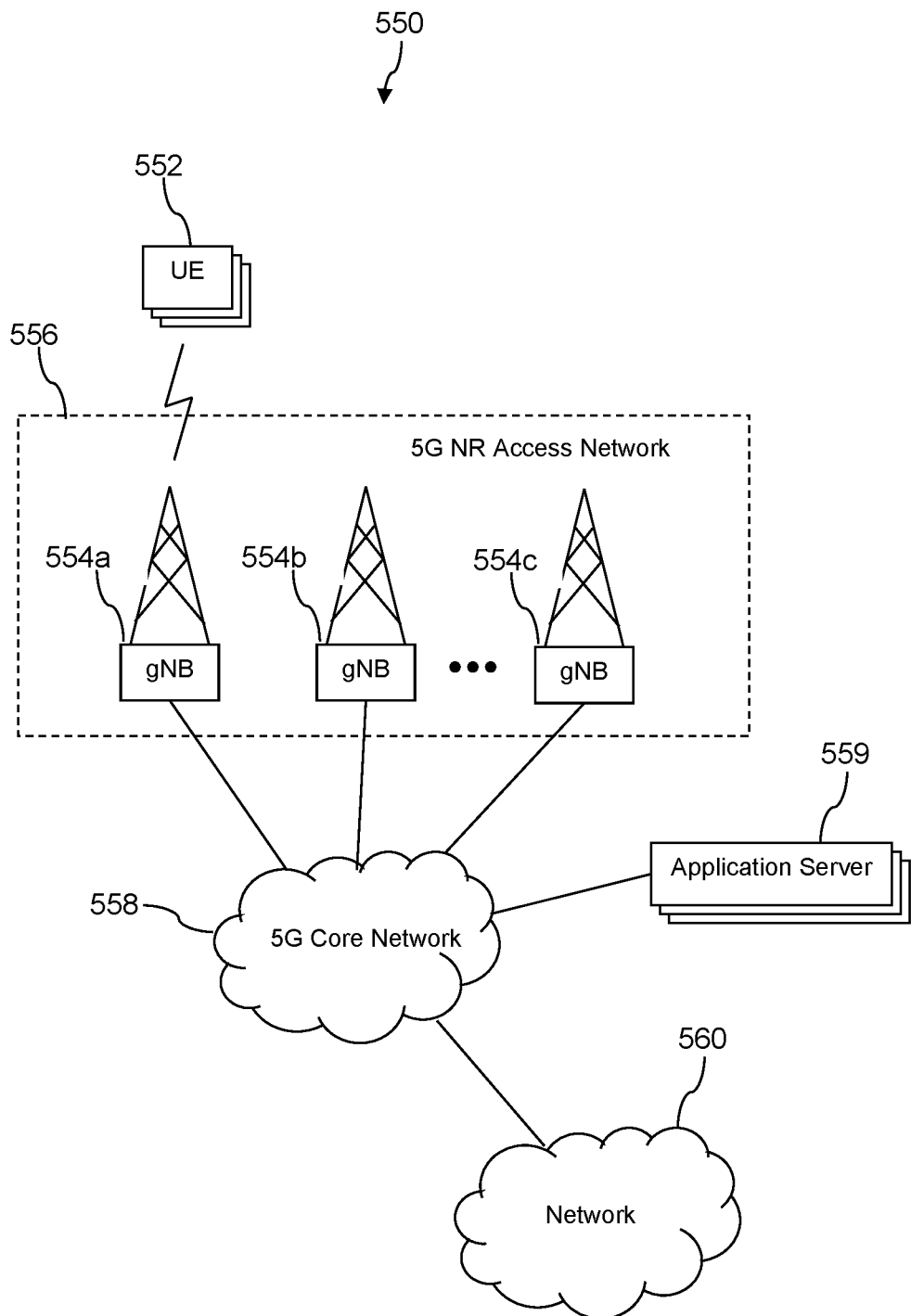
FIG. 9A is a block diagram of an exemplary communication system according to an embodiment of the disclosure.

Turning now to FIG. 9A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user-operated), can operate. The access nodes 554 may be said to establish an access network 556. In a 5G technology generation, an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end-user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within the coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rates and quality of service for end-users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT). 5G is hoped to provide virtually unlimited bandwidth on demand, for example, providing access on-demand to as much as 10 gigabits per second (gbps) downlink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgment messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgment signaling from UEs 552 to the access node 554.

Figure 9B:
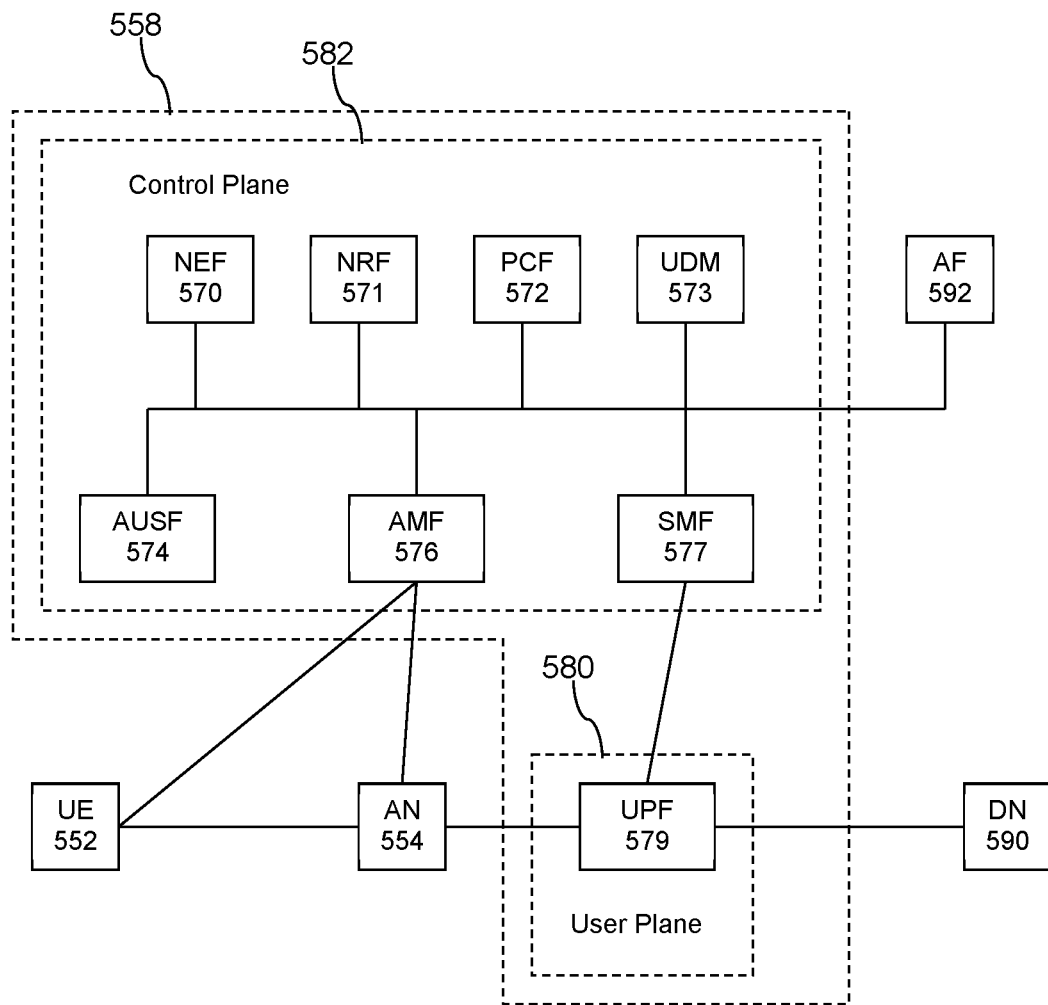
FIG. 9B is a block diagram of a 5G core network according to an embodiment of the disclosure.

Turning now to FIG. 9B, further details of the core network 558 are described. In an embodiment, the core network 558 is a 5G core network. 5G core network technology is based on a service-based architecture paradigm. Rather than constructing the 5G core network as a series of special-purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 574, an access and mobility management function (AMF) 576, a session management function (SMF) 577, a network exposure function (NEF) 570, a network repository function (NRF) 571, a policy control function (PCF) 572, a unified data management (UDM) 573, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 574 facilitates security processes.

The NEF 570 securely exposes the services and capabilities provided by network functions. The NRF 571 supports service registration by network functions and the discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example, an enterprise customer, that is composed of a plurality of 5G network functions that are configured to provide customized communication service for that subscriber, for example, to provide communication service in accordance with communication policies defined by the customer.

Figure 10A:
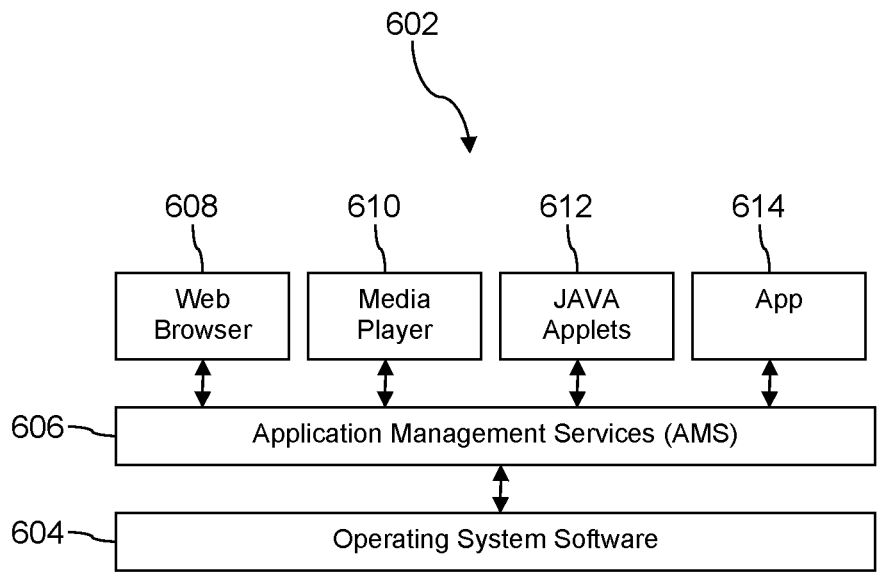
FIG. 10A is a block diagram of a software architecture of a mobile communication device according to an embodiment of the disclosure.

FIG. 10A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications 614 running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 10B:
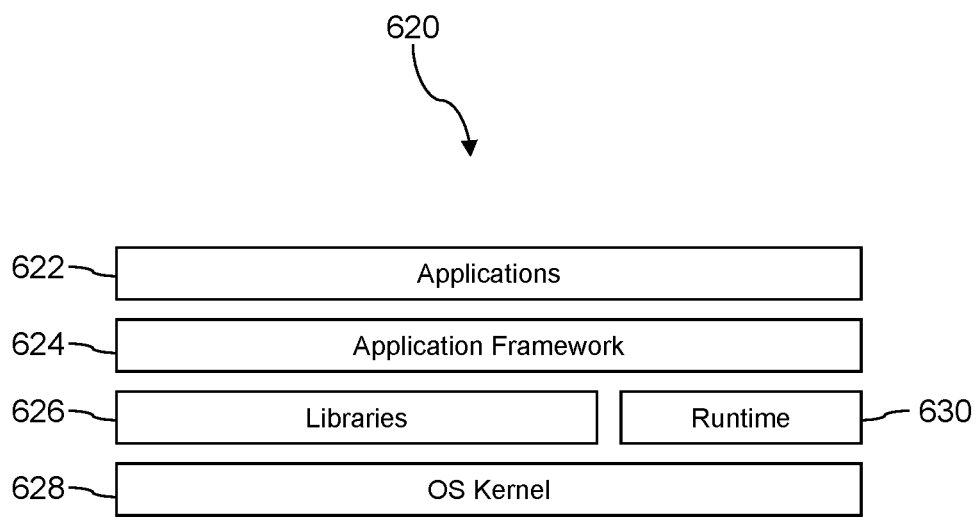
FIG. 10B is a block diagram of another software architecture of a mobile communication device according to an embodiment of the disclosure.

FIG. 10B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 11:
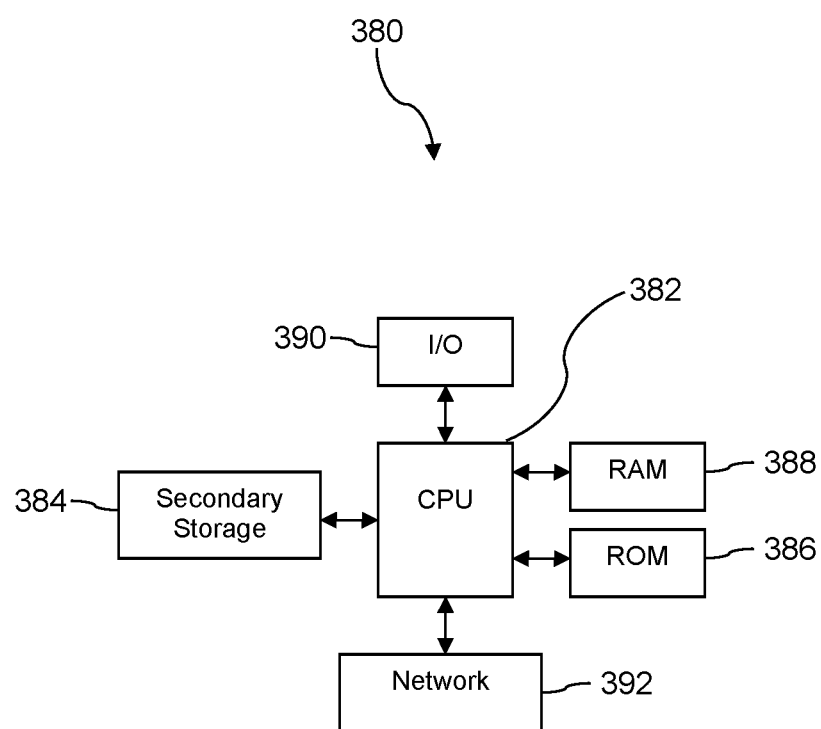
FIG. 11 is a block diagram of a computer system according to an embodiment of the disclosure.

FIG. 11 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio Frequency Identification (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An energy harvesting radio Frequency Identification (RFID) chip with two level power output, comprising:
   a processor;
   a non-transitory memory;
   a first radio transceiver;
   an impedance circuit configured to convert radio frequency (RF) energy from ambient RF signals received by a first energy harvesting antenna to a first electrical energy level and to convert RF energy from proximate RF signals to a second electrical energy level;
   an energy storage device configured to store electrical energy; and
   an application stored in the non-transitory memory that, when executed by the processor in response to the first electrical energy level, transfers a beacon to the first radio transceiver to broadcast in a first RF range; and in response to the second electrical energy level, transfers a message to the first radio transceiver or a second radio transceiver to broadcast in a second RF range.

2. The RFID chip of claim 1, further comprising:
   a second energy harvesting antenna, wherein the energy harvesting for the second energy harvesting antenna is in the second RF range; and
   the second radio transceiver, wherein the second radio transceiver broadcasts the message on the second RF range.

3. The RFID chip of claim 1, wherein the electrical energy storage device is a capacitor, a battery, or a combination of both.

4. The RFID chip of claim 1, wherein the first RF range is one of 2.40 GHz to 5.990 GHz, 698 MHz to 746 MHz, 814 MHz to 894 MHz, 1.710 GHz to 2.200 GHz, 1.85 GHz to 1.995 GHz, 3.550 GHz to 3.700 GHz, 5.150 GHz to 5.925 GHz, 617 MHz to 698 MHz, 2.496 GHz to 2.69 GHz, 26.5 GHz to 29.5 GHz, or 37.0 GHz to 40.0 GHz.

5. The RFID chip of claim 1, wherein the beacon is an RFID identification.

6. The RFID chip of claim 1, wherein the message consists of at least one of an RFID identification and a stored information.

7. The RFID chip of claim 1, wherein one of the first or second RF range is 2.4 to 5.990 GHz.

8. The RFID chip of claim 1, wherein the beacon is transmitted periodically.

9. The RFID chip of claim 8, wherein the beacon is transmitted intermittently based on an amount of ambient RF received.

10. The RFID chip of claim 1, wherein the beacon only announces the presence of the RFID chip and does not comprise any confidential information.

11. The RFID chip of claim 1, wherein the first energy harvesting antenna harvests the ambient RF signals from one or more of a cellular network access node, cell site signals, WiFi signals, or cell phone signals.

12. The RFID chip of claim 1, wherein the proximate RF signals are received responsive to the beacon being broadcast.

13. The RFID chip of claim 1, wherein the second electrical energy level is more than the first electrical energy level, and wherein the message is broadcast at a higher power than the beacon.

14. The RFID chip of claim 1, wherein the RFID tag is retained within an article made from textile fabric.

* * * * *